United States Patent Office 3,406,643
Patented Oct. 22, 1968

3,406,643
METHOD AND APPARATUS FOR MIXING DOUGH
John Harry Clapham Atkins, Tallington, Stamford, and Arnold Stephenson, Peterborough, England, assignors to Baker Perkins Incorporated, Saginaw, Mich.
Filed Nov. 17, 1965, Ser. No. 508,396
Claims priority, application Great Britain, Nov. 23, 1964, 47,605/64; Dec. 29, 1964, 52,701/64, 52,702/64
9 Claims. (Cl. 107—36)

ABSTRACT OF THE DISCLOSURE

A method and apparatus for mechanically developing a mass of dough and in which a vessel having an arcuate wall has at least one rotatable beater blade shaped to separate a piece of dough from the mass, advance the piece along the arcuate wall, and simultaneously roll the piece and subject it to intense pressure between the blade and the arcuate wall. Rotation of the blade following rolling and pressing of the dough piece returns the piece to the dough mass, whereupon the cycle is repeated with another piece of dough.

---

Figure 1:
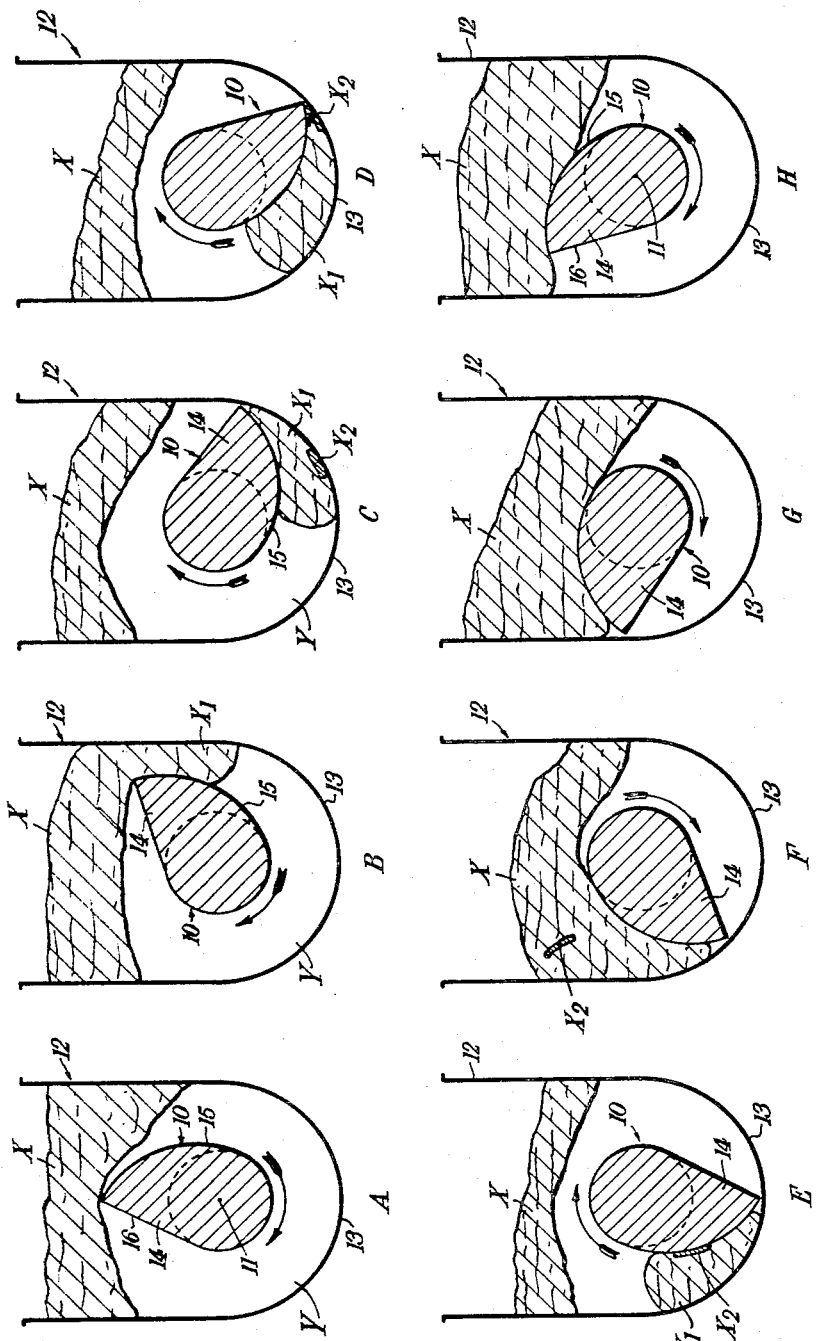

In the conventional method of producing bread dough, the dough ingredients are mixed together in batch form and then allowed to ferment for two or three hours. The dough is then divided into portions of the required size, which are eventually placed into tins and baked in an oven. Whilst in this method development of the dough is achieved by fermentation, alternative processes, such as that known as the Chorleywood bread process, have come into use comparatively recently, and these rely on mechanical development of the dough by subjecting it to rapid and intense mechanical working. The main advantages of mechanical development are:

(1) An increased yield of bread because an extra gallon of water is added per sack of flour, i.e. 10 lbs. extra water per 280 lbs. of flour,
(2) A reduction of time since the long term fermentation operation is eliminated, and
(3) A reduction in space since no fermentation space is necessary.

The present invention has for its objects to provide an improved method for the mechanical development of bread dough under conditions which permit fermentation to be dispensed with.

The invention provides a method for the mechanical development of bread dough which comprises subjecting bread dough ingredients or premixed dough to mixing in a vessel which is incompletely filled with the ingredients or dough and contains a rotating blade which, in operation, subjects a piece of dough to a peeling and rolling action and intense pressure in the vicinity of the tip of the blade whilst advancing substantially the whole piece of dough forward in front of the rotating blade.

The invention includes a method for the mechanical development of bread dough which comprises subjecting bread dough ingredients or premixed dough to mixing in a vessel which is incompletely filled with the ingredients or dough and contains a rotating blade which, at each revolution, peels a piece of dough from the wall of the vessel, subjects said piece of dough to a rolling action against the wall of the vessel and intense pressure in the vicinity of the tip of the blade and thereafter releases the piece.

The invention includes a method for the mechanical development of bread dough which comprises subjecting dough ingredients or premixed dough to the action of a rotating bladed beater in a vessel which is incompletely filled with the ingredients or dough, and has a wall which is curved over a substantial arc to the form of a part cylinder coaxial or nearly coaxial with the shaft of the beater, the beater having a blade which periodically approaches, sweeps past and then leaves said curved portion of the wall of the vessel and traverses said curved portion of the wall with its tip travelling in a path close to the wall so as to peel at each passage past the curved portion of the wall a piece of dough from the wall and roll the piece, as it travels forward in advance of the blade, while subjecting it to intense pressure in the vicinity of the nip between the wall and the tip of the blade and substantially preventing escape of dough from the nip to the rear of the blade, the blade releasing the roller pieces of dough in succession as it leaves the curved portion of the wall.

The beater rotates at high speed, for example in a typical case at 260–270 r.p.m., and development of the dough is completed in a short time, for example 5 minutes or less. The tip of the blade will normally be spaced by ¼ inch or less from the part cylindrical portion of the wall of the vessel as it traverses said curved portion to peel off, roll and press successive pieces of dough. The part cylindrical portion of the wall of the vessel preferably extends over an arc of approximately 180°.

The vessel is preferably in the form of a horizontal trough with the beater disposed within it for rotation about a horizontal axis. Preferably the vessel contains a single beater, but twin beaters may be provided in the vessel side by side and in this case the wall of the vessel will be provided with two part cylindrical portions, one for cooperation with each beater.

The vessel may be fed with dough ingredients batchwise or continuously. If desired, the ingredients may be premixed before delivery to the vessel.

The blade may extend axially of the beater, but it is preferably given a helix angle so that it will be effective to move the dough ingredients axially through the vessel and to ensure uniform mixing. It is preferably of quadrant form, and the direction of rotation of the beater is preferably such that the convexly curved face of the blade leads. If desired, the beater may be provided with two diametrically disposed blades of the same configuration.

After development the dough may be further processed in accordance with the wishes of the baker. Thus it may be delivered directly to a divider-panner, subjected to proving under controlled conditions of temperature and humidity for 40–60 minutes and then baked. Alternatively it can be divided, subjected to a short first proving operation, moulded, panned and then subjected to a second proving operation followed by baking.

Figure 2:
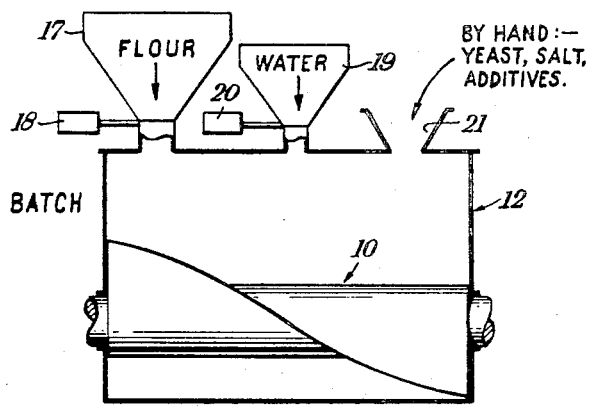
Figure 3:
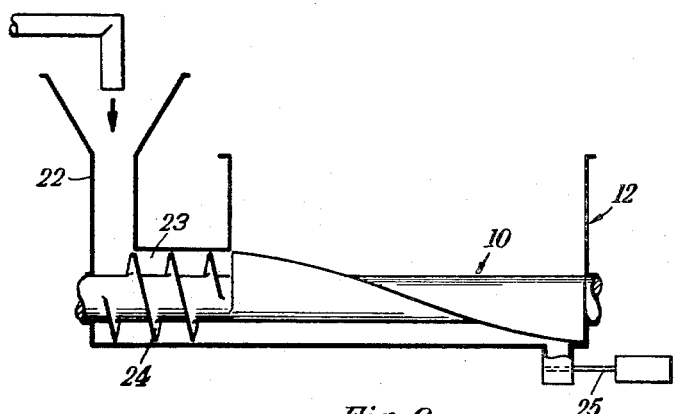
Figure 4:
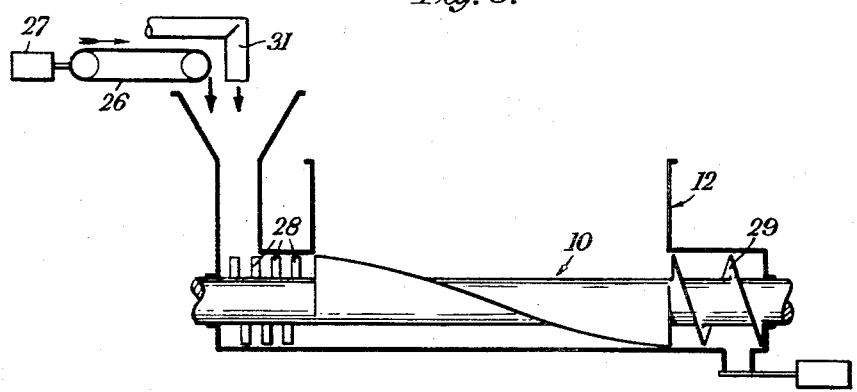
Figure 5:
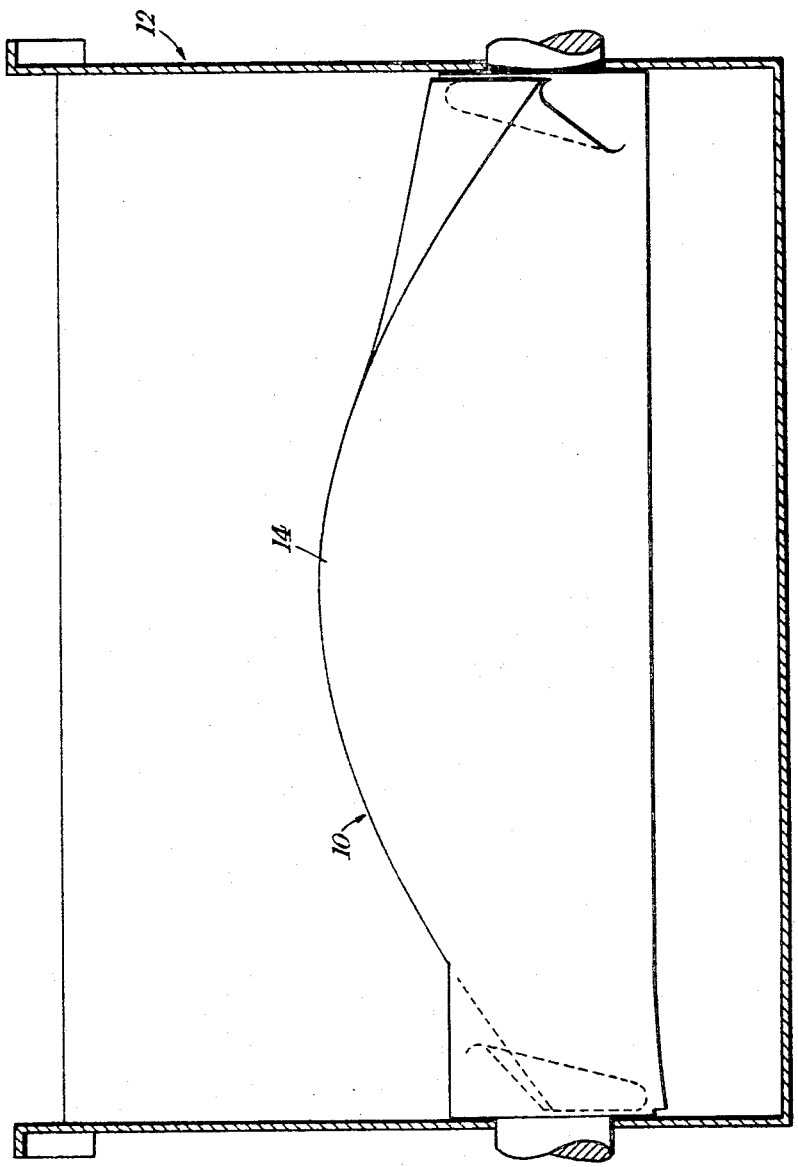
Figure 6:
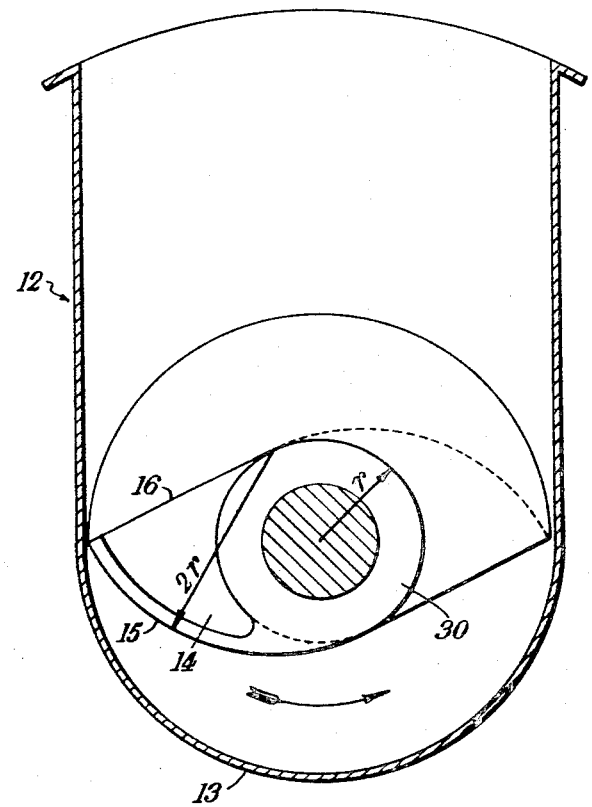
Figure 7:
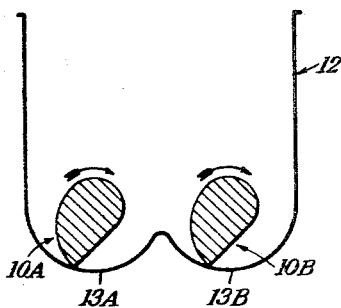
Figure 8:
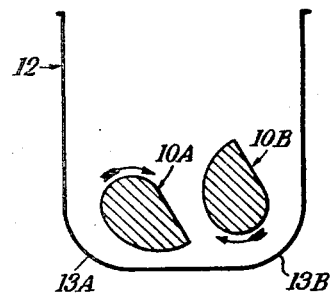

The invention will now be further explained with reference to the accompanying drawings, in which:

FIG. 1 is a diagram showing, at A–H, successive stages stages in the rotation of the beater,
FIG. 2 shows diagrammatically apparatus for batch-wise development of dough ingredients,
FIG. 3 shows diagrammatically apparatus for the continuous development of premixed dough,
FIG. 4 shows diagrammatically apparatus for the continuous development of dough ingredients,
FIG. 5 is a longitudinal section through a preferred form of apparatus for carrying out the method according to the invention.
FIG. 6 is a corresponding cross section, and
FIGS. 7 and 8 are diagrammatic cross sectional views showing alternative forms of apparatus employing two beaters.

Like reference numerals denote like parts throughout the figures.

FIG. 1 shows a beater 10 rotating about an axis 11 in a horizontal trough 12 having a part cylindrical lower portion 13 which is struck to a radius about the axis 11. The beater 10 has a blade 14 of approximately quadrant form having a curved leading edge 15 and a straight trailing edge. 16.

The trough 12 is incompletely filled with dough and the tip of the beater 10 is shown, at stage A, as having just passed its uppermost position. As shown the beater tends to keep the dough X in the position shown, with a void Y beneath it. At stage B the beater has begun to bite off or separate a piece $X_1$ of dough from the mass and, as the trailing edge 16 of the beater blade reaches an approximately horizontal position, intermediate between stages B and C, the beater separates the piece $X_1$ from the dough X and begins to advance the piece $X_1$ along the wall of the trough 12 to the curved portion 13 thereof. At stage C the piece $X_1$ which has been completely separated from the dough X, can be considered as made up of numerous smaller portions, one of which is indicated at $X_2$. As the beater rotates through stages C–E the trailing end of the piece X, is continually peeled from the wall and each of the small portions $X_2$ is submitted to intense pressure and to a rolling action caused by the peeling, as indicated at stage D, in the vicinity of the nip between the tip of the blade 14 and the curved portion 13 of the trough. As the trailing end of the piece X is continually peeled from the wall 13, each portion $X_2$ will be advanced in a rolling movement as is indicated by the position of portion $X_2$ in stage E. Each such pressed and rolled portion $X_2$ is subsequently released by the beater as indicated at stage F and the peeling, pressing and rolling action terminates when the tip of the beater leaves the curved portion 13 of the trough at stage G. Between stages E and F the peeled piece of dough is displaced into the uncompacted mass of dough above the beater. Since the beater rotates at a high speed, e.g. 260–270 r.p.m., the uncompacted mass of dough tends to perform a see-saw motion in the trough.

FIG. 1 shows the action at one cross-sectional plane through the trough. As later explained, the blade of the beater is normally helical and in this case while one part of the blade is at stage A, another part will be at a lower level in the trough and subjecting some of the dough to the peeling, pressing and rolling action shown at stages B–F. Although there is a small clearance between the tip of the blade and the curved portion 13 of the trough, substantially no dough escapes through this clearance to the rear of the blade.

As shown in FIG. 2, dough ingredients may be supplied batchwise to the trough 12, flour being delivered from a hopper 17 under control of a metering device 18, water being delivered from a tank 19 having a discharge jet 20, and yeast, salt, fat and other additives being added by hand through an inlet 21.

Alternatively, as shown in FIG. 3, premixed dough may be supplied continuously through an inlet 22 to a chamber 23 containing a feed form 24 which delivers the dough to the vessel 12, which is provided with an outlet valve 25 for discharge of the developed dough.

Alternatively, as shown in FIG. 4, dough ingredients may be supplied continuously to the trough 12. Flour is supplied by a conveyor belt 26 under control of a weigh feeder 27 and the other ingredients, suitably metered, are supplied in solution in water through a pipe 31. The flour is given a preliminary mixing with the solution by mixing paddles 28 prior to entry into the trough 12. The developed dough leaving the trough 12 may be subjected to pressurisation in a zone 29 to permit the use of a dividing head.

In the construction shown in FIGS. 5 and 6, the blade 14 extends helically in relation to the shaft 30 of the beater 10 for approximately half a turn. As shown the radius of curvature of the curved leading edge 15 of the blade 14 may be twice the radius of curvature of the shaft 30. The angle between the tangents to the curved face 15 of the blade and the curved wall 13 of the trough at the point of clearance is preferably 30–35°.

If desired, the beater may have two diametrically opposed blades. The portions of the side walls of the trough above the curved portion 13 may be parallel, convergent or divergent and the trough may be open or provided with a cover as preferred.

As shown in FIGS. 7 and 8, the trough 12 may contain two beaters 10A, 10B corresponding in configuration to the beater 10 and disposed side by side. The vessel 12 may be provided with curved portions 13A, 13B each cooperating with one of the beaters. In FIG. 7 the curved portions 13A and 13B are formed on arcs coaxial with the axes of rotation of the respective beaters 10A and 10B and are joined by a cusp-shaped internal rib. In FIGURE 8 the curved portions 13A and 13B also are formed on arcs coaxial with the axes of the respective beaters and are joined by a flat wall portion.

What we claim as our invention and desire to secure by Letters Patent is:

1. A method of mechanically developing a mass of dough in a walled mixing vessel incompletely filled with said dough, said method comprising the steps of separating a piece of dough from said mass, advancing said piece along a wall of said vessel and continually peeling its trailing edge from said wall whereby increments of said piece are rolled about an axis at said wall, and returning said piece to said mass following its being rolled.

2. The method set forth in claim 1 including subjecting said piece to intense pressure against said wall of said vessel during advancing of said piece.

3. The method set forth in claim 1 wherein said steps are repetitive on successive pieces of dough following the return of the first mentioned piece to said mass.

4. The method set forth in claim 1 including moving said dough mass through said vessel along said axis.

5. Apparatus for mixing dough comprising a vessel for containing a mass of dough; a blade; and means mounting said blade in said vessel for rotation about an axis, said vessel having a wall portion curved over a substantial arc substantially coaxial with said axis, said blade having a tip so positioned relatively to said wall that during rotation of said blade said tip periodically approaches, sweeps closely past and leaves said curved wall portion, the arrangement being such that the tip of said blade may separate a piece of dough from said mass, advance said piece along said curved portion and continually peel the trailing end of said piece from the curved portion of said wall and subject said piece to intense pressure between said tip and said curved wall portion, and return said piece to said mass.

6. The apparatus set forth in claim 5 wherein said axis is substantially horizontal.

7. The apparatus set forth in claim 5 wherein said blade is substantially quadrant shaped having its curved face leading during rotation of said blade.

8. The apparatus set forth in claim 5 wherein said blade is helical to move dough in said vessel axially of said blade.

9. The apparatus set forth in claim 5 wherein said vessel has a second curved wall portion similar to the first mentioned portion and a second blade similar to the first mentioned blade, and means mounting said second blade substantially parallel to said first mentioned blade and substantially coaxially with said second curved wall portion.

References Cited

UNITED STATES PATENTS

| | | | |
|---|---|---|---|
| 1,857,361 | 5/1932 | Davis | 259—109 |
| 1,851,388 | 3/1932 | Hackstedde | 259—109 |
| 2,931,320 | 4/1960 | Bandel | 107—40 |
| 3,125,968 | 3/1964 | Baker | 107—30 |

WALTER A. SCHEEL, *Primary Examiner.*

J. SHEA, *Assistant Examiner.*